Nov. 23, 1926.  
H. W. HARTZELL  
1,607,950  
PROTECTIVE COVER FOR AUTOMOBILES  
Filed June 4, 1925   2 Sheets-Sheet 2
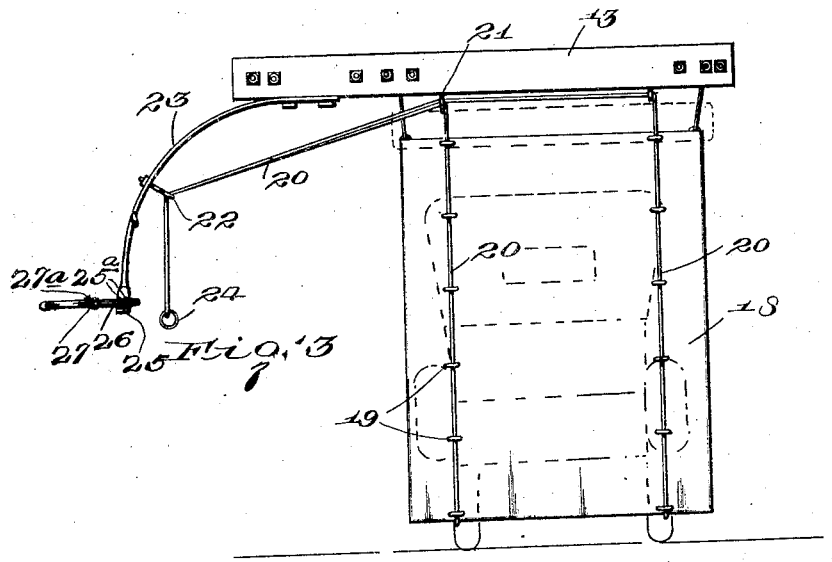
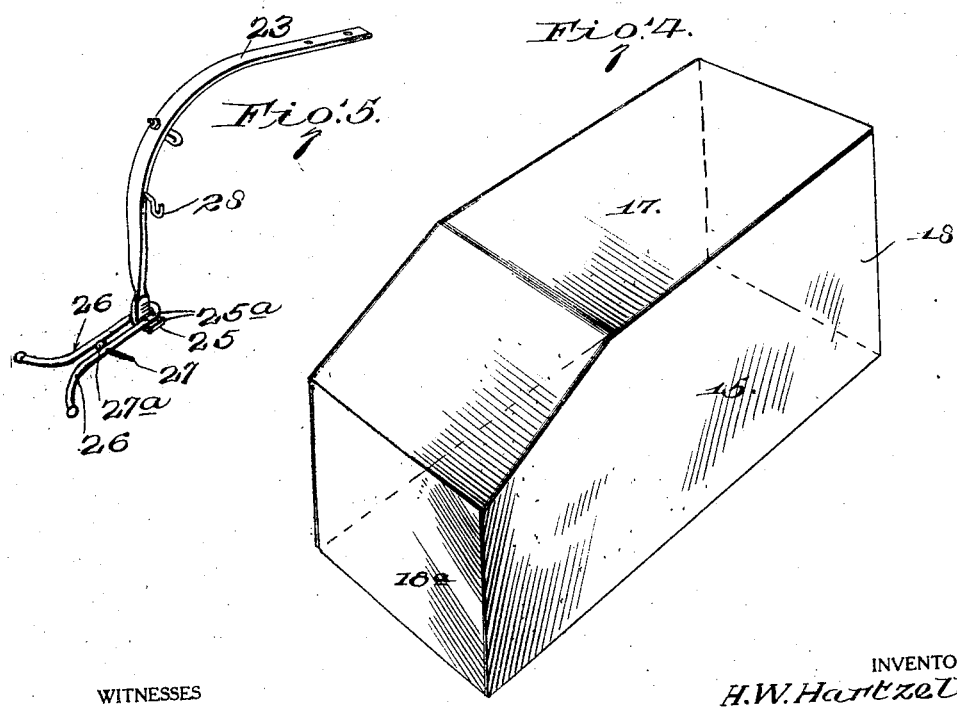

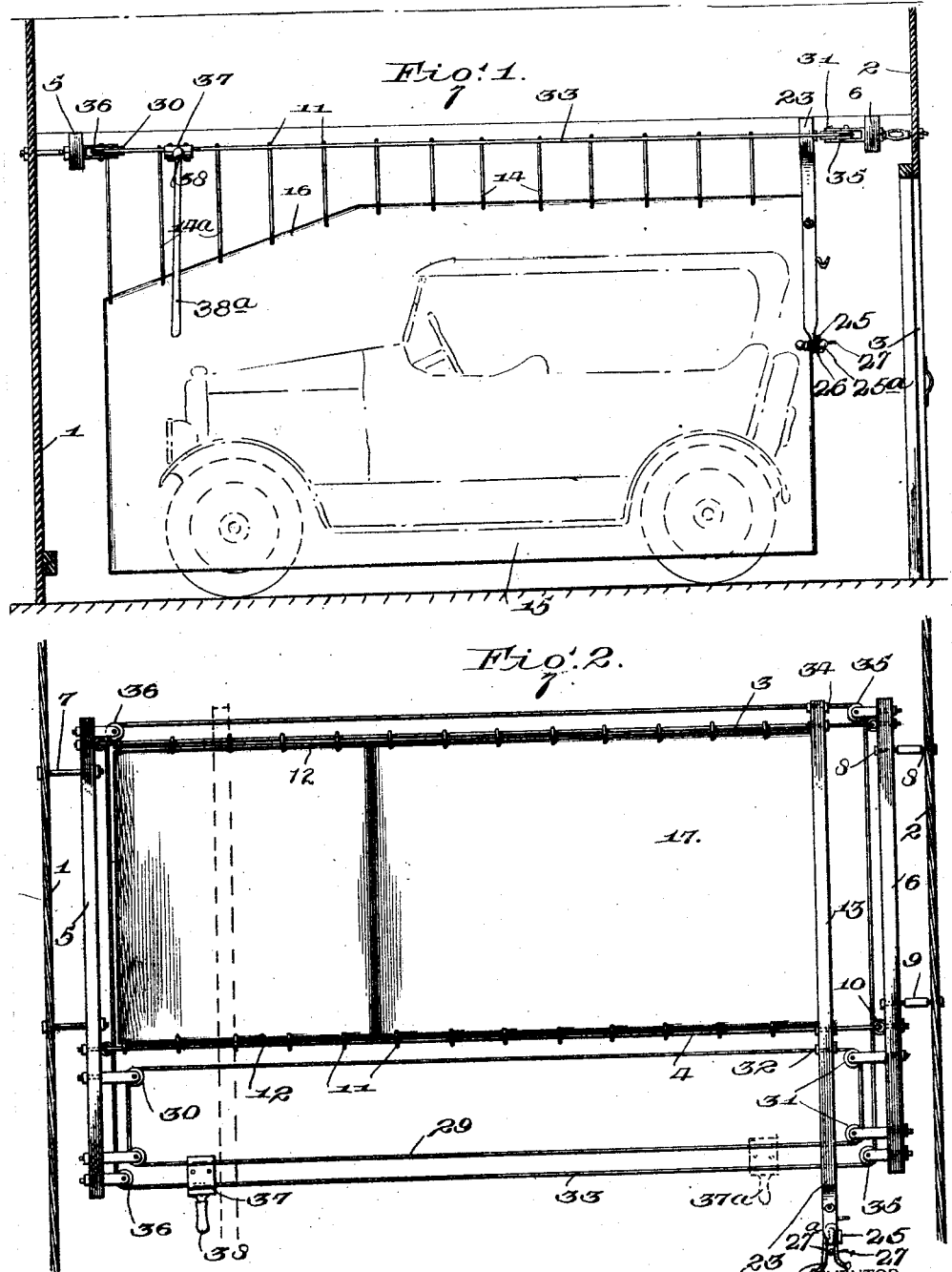

Patented Nov. 23, 1926.

1,607,950

UNITED STATES PATENT OFFICE.

HARRY WALLACE HARTZELL, OF MADISON, KANSAS.

PROTECTIVE COVER FOR AUTOMOBILES.

Application filed June 4, 1925. Serial No. 34,923.

This invention relates to protective covers for automobiles and has for its object the provision of a dust cover adapted to be supported in operative relation with an automobile in the interior of a garage and which may be folded out of the way when not in use and into a compact unitary structure.

A further object of the invention is the provision of a device for enclosing automobiles to prevent the collection of dust upon the same and which may be conveniently moved into a compact unit by the manipulation of instrumentalities at an advantage point adjacent the automobile.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view in elevation of the dust cover applied in operative relation to an automobile.

Figure 2 is a plan view of the same.

Figure 3 is an end view showing the end closure which is adapted to be elevated beyond the reach of the automobile.

Figure 4 is a view in perspective of the cover extended in operative position.

Figure 5 is a view in perspective showing a detail of the securing means for the guards which maintain the end closure in an inoperative position.

Referring more particularly to the drawings, 1 and 2 designate respectively the rear and front walls of a garage having a door 3 in which the automobile is adapted to enter and be received by a dust covering supported from suspension wires 3 and 4. These wires are located in parallel relation a suitable distance above the floor of the garage by means of transverse supporting bars 5 and 6. The bar 5 is secured to the rear wall 1 by means of bolts 7 while the front bar 6 is secured to the front wall 2 by means of threaded bolts 8 adjusted toward or away from each other by a turn-buckle 9 in order to maintain the proper tension on the wires 3 and 4. Said suspension wires have their ends secured to eye bolts 10 mounted in spaced relation on the rear and front beams 5 and 6.

A plurality of rings 11 are received by the wire 4 and are maintained in spaced relation by means of a cord 12 which is secured to each ring with one end of the cord being secured to the guiding bar 13, and the other end of the cord secured to a screw eye in the bar 5. When this cord is tight all rings are held in their proper positions on the suspension wires 3 and this is also true of the wires 4. This guide bar is provided with perforations through which the wires 3 and 4 are inserted whereby the suspension wires are maintained in spaced relation and said bar is permitted to slide on said wires. Cords of any approved material 14 are connected with the rings 11 and secured to the upper edges of the side walls 15 of the dust cover.

The rear portions adjacent the upper edge of the side walls are cut away as shown at 16 where the cover is disposed over the hood of the automobile and in this case the cords $14^a$ have a greater length than the cords 14 for securing the rear portions of the dust cover to the rearwardly disposed rings. To the upper edges of the side walls 15 are secured the adjacent edges of the top portion of the dust cover, the rear portion of the top being inclined downwardly to conform to the inclination 17 of the rear top edges of the side walls. The rear end of the cover adjacent the wall 1 is closed by an end wall $18^a$.

The front end of the cover adjacent the door 3 is closed by an end wall 18 which is provided with a plurality of rings 19 located in spaced relation and in a vertical line. In each vertical series of rings is inserted a cable or cord 20, the cable being tied to the lowermost ring. These cables are entrained over pulleys 21 secured to the guide bar 13 and are carried to one side of the side walls of the dust cover, passed through an eye bolt 22 carried by a curved bracket arm 23 which is secured to the under face of the bar 13. The end of the cable is secured to a ring 24 which is of sufficient diameter to prevent it being forced through the eye of the bolt 22. The end of the flat bracket is twisted and then bent laterally as shown at 25 to form a seat for a U-shaped steel spring clip 26. The clip is secured to the extension 25 by means of rivets $25^a$. The free ends of the arms of the clip are flared in order to permit of the ready insertion of the cable or cord 20.

A headed stud 27 is inserted through a perforation in the arm 26a of the clip with the head 27a disposed between the arms of said clip so that when the cable 20 is forced between the arms it will be gripped by said clip and limited in its inward movement by the head of the stud. This stud is also employed as an annular post around which a loop of the cord 20 is wound before insertion into the flared clip. The ring 24 on the end of the cable is placed upon a hook 28 secured to the bracket 23 after the cable has been gripped by the arms of the clip 26.

An endless cable 29 is supported by pulleys 30 to the cross bar 5 and pulleys 31 supported by the cross bar 6. This endless cable is secured as shown at 32 to the guide bar 13 while an endless cable 33 is secured, as shown at 34 to the outer end of the guide bar 13, and is entrained over a pair of pulleys 35 carried by the cross bar 6. The cable 33 is also entrained over pulleys 36 carried by the cross bar 5. A cross head 37 is secured to both cables 29 and 33 and is provided with an operating handle 38 to which is connected a depending handle 38a adapted to be grasped by the hand and moved to either the full line position shown in Figure 2 or to the dotted line position shown at 37a.

It will be noted that the cover encloses the automobile at the top and on all four sides and is only open at the bottom thereby forming substantially a sack or portable garage which is placed over the automobile and protects the vehicle against dust when employed in connection with the garage and protects the automobile from the elements and will operate as a substitute for a garage. When the cover is used in the last instance, it may be connected to cross beams carried by posts or any form of mounting suitable for the purpose.

When it is desired to enclose the automobile with the sack like covering the cross head 37 which is at the point in Figure 2 as indicated by dotted lines 37a is moved rearwardly to the full line position and the cables 29 and 33 are simultaneously operated forcing the bar 13 forwardly towards the front wall 2 of the garage until it reaches the full line position shown in Figure 2. Since the cable 20 has been drawn taut and the front end wall 18 is in an elevated position the ring 24 is removed from the hook 28 and the cable is released from the gripping arms of the spring clip 26 and by releasing the hold upon the ring 24 the front wall will unfold itself through gravity and be positioned in spaced relation with the back of the automobile. When the bar 13 is being moved forwardly by the cables 29 and 33 which connect with the opposite ends of said bar the top portion 17 of the cover is likewise being unfolded and placed above the top of the automobile.

When it is desired to remove the cover, a pull is exerted on the cable 20 thereby causing the front end 18 of the sack like cover to be elevated to a point adjacent the bar 13 and above the top of the automobile. The cable is then forced between the gripping arms of the steel clip 26 for clamping the cable against slippage and the ring 24 is then placed upon the hook 28. The cross head which when the cover is in operative position is located at the full line position shown in Figure 2, is moved forwardly while the bar 13 is moved rearwardly carrying the folded end wall 18 of the cover over the top of the automobile and at the same time placing the top 17 of the cover in folds which are supported by the cables 14 and 14a. When the cross head 37 is at its forward position as indicated by dotted lines at 37a, the bar 13, together with its folded sections of the cover, will be located at the dotted line position at the front end of the car and at the rear of the garage. It will be noted that the cross head or block 37 moves in a direction which is opposite to the direction of movement of the bar 13 at all times by reason of the connection of the ends of said bar with the endless cables 29 and 33.

Owing to the fact that both cords are gripped together by the cross head clamp 37, both cables 29 and 33 always travel the same distance and same rate of speed which keeps bar 13 directly transverse to cables 3 and 4, and hence no binding or gripping of the cables 3 and 4 can occur by bar 13, as would occur if one end got ahead of the other in moving bar 13. Where the cover is used in large storage garages, and where it is necessary to park cars very close together, it will be inconvenient to place the handle 38a between the cars and in such a case, the cables are provided with extensions running along the front of the garage, and said handles are connected to a cable so that the same may be manipulated in front, rather than at the sides, as shown in the drawing. By this arrangement, it will be seen the cars may be parked right closely together and the covers operated without any inconvenience to the person attempting to remove the cover.

What I claim is:

1. A foldable dust guard for automobiles comprising side walls and a top connected together along their edges and formed of flexible material, suspension rods having the ends rigidly fixed for maintaining the rods in spaced relation, rings slidably mounted on the rods, flexible means connecting the rings with the side walls and top of the dust cover, a guide bar slidably mounted on the spaced suspension rods and adapted when moved to cause folding or unfolding of the side walls and top of the cover, an end wall depending from the guide bar, means for causing the end wall to be elevated in folded relation adjacent the guide bar, and means for sliding the guide bar upon the suspension rods.

2. A foldable dust guard for automobiles comprising side walls and a top connected together along their edges and formed of flexible material, suspension rods having the ends rigidly fixed for maintaining the rods in spaced relation, rings slidably mounted on the rods, flexible means connecting the rings with the side walls and top of the dust cover, a guide bar slidably mounted on the spaced suspension rods and adapted when moved to cause folding or unfolding of the side walls and top of the cover, an end wall depending from the guide bar, means for causing the end wall to be elevated in folded relation adjacent the guide bar, means for sliding the guide bar upon the suspension rods, and means for maintaining the suspension rods taut.

3. A foldable dust guard for automobiles comprising side walls and a top connected together along their edges and formed of flexible material, suspension rods having the ends rigidly fixed for maintaining the rods in spaced relation, rings slidably mounted on the rods, flexible means connecting the rings with the side walls and top of the dust cover, a guide bar slidably mounted on the spaced suspension rods and adapted when moved to cause folding or unfolding of the side walls and top of the cover, an end wall depending from the guide bar, means for causing the end wall to be elevated in folded relation adjacent the guide bar, means for sliding the guide bar upon the suspension rods, cables connected with the end wall, pulleys supported by the guide bar over which the cables are entrained, and means projecting from the guide bar for securing the cables against movement when the end wall has been elevated.

4. A foldable dust guard for automobiles comprising side walls and a top connected together along their edges and formed of flexible material, suspension rods having the ends rigidly fixed for maintaining the rods in spaced relation, rings slidably mounted on the rods, flexible means connecting the rings with the side walls and top of the dust cover, a guide bar slidably mounted on the spaced suspension rods and adapted when moved to cause folding or unfolding of the side walls and top of the cover, an end wall depending from the guide bar, means for causing the end wall to be elevated in folded relation adjacent the guide bar, means for sliding the guide bar upon the suspension rods, said means for operating the end bar in opposite directions on the suspension rods comprising a pair of endless cables, each cable secured to an end of the guide bar, pulleys for supporting the cables, means connecting the endless cables whereby actuation of said means will cause the cables to travel in unison for moving both of the ends of the guide bar in the same plane when the top and side walls of the dust cover are folded or unfolded.

5. A foldable dust guard for automobiles comprising side walls, a top wall, and end walls connected together along their edges and formed of flexible material thereby providing a sack-like cover for the vehicle which is open only at its lower side, means for elevating the forward end of the sack like covering by placing the same in folds and simultaneously elevating the forward ends of the side walls of the sack like covering, and means for moving the top of the cover and the folded front wall and the side walls rearwardly while progressively folding the side walls and the top as the covering is being moved to an inoperative position.

H. W. HARTZELL.